US011709821B2

(12) United States Patent
Caro et al.

(10) Patent No.: US 11,709,821 B2
(45) Date of Patent: Jul. 25, 2023

(54) TRACKING CHANGE DATA IN A DATABASE (71) Applicant: Embarcadero Technologies, Inc., Austin, TX (US)

(72) Inventors: Charles W. Caro, Apex, NC (US); Sriram Balasubramanian, San Jose, CA (US); Stephen Peter Ball, Bagshot (GB)

(73) Assignee: Embarcadero Technologies, Inc., Austin, TX (US)

( * ) Notice: Subject to any disclaimer, the term of this patent is extended or adjusted under 35 U.S.C. 154(b) by 0 days.

(21) Appl. No.: 17/991,711

(22) Filed: Nov. 21, 2022

(65) Prior Publication Data
US 2023/0092911 A1 Mar. 23, 2023

Related U.S. Application Data (63) Continuation of application No. 17/339,624, filed on Jun. 4, 2021, now Pat. No. 11,520,772, which is a continuation of application No. 16/547,441, filed on Aug. 21, 2019, now Pat. No. 11,055,276, which is a continuation of application No. 14/823,884, filed on Aug. 11, 2015, now Pat. No. 10,430,403.

(60) Provisional application No. 62/039,824, filed on Aug. 20, 2014.

(51) Int. Cl.
G06F 16/00 (2019.01)
G06F 16/23 (2019.01)
G06F 16/21 (2019.01)

(52) U.S. Cl.
CPC ........ *G06F 16/2365* (2019.01); *G06F 16/219* (2019.01)

(58) Field of Classification Search
CPC .................................................. G06F 16/2365
See application file for complete search history.

(56) References Cited

U.S. PATENT DOCUMENTS

| 7,305,386 | B2 | 12/2007 | Hinshaw et al. |
| 2004/0249838 | A1 | 12/2004 | Hinshaw et al. |
| 2007/0011211 | A1 | 1/2007 | Reeves et al. |
| 2016/0055197 | A1 | 2/2016 | Caro |

Primary Examiner — Ajith Jacob (57) ABSTRACT

Methods and systems are disclosed for tracking change data in a database. A database, stored at a computer system, is accessed with a plurality of data written to fields in the database, wherein each data in the fields comprises a record header. Data is changed in at least one field of the plurality of data in the database via the computer system, wherein the changing the data changes the record header for the at least one field. A transaction identification (ID) is stored in the record header for each change to the at least one field. A flag is created in the record header signaling the change to the at least one field. Successive versions of the database are linked together such that a subscriber accessing the database can automatically view a current version of the database with the change by accessing the record header and identifying the flag.

20 Claims, 5 Drawing Sheets

FIG. 1

Database
200

| | Column 202 | Column 204 | Column 206 | Column 208 |
|---|---|---|---|---|
| Row 210 | Change | Name | Department | Salary |
| Row 212 | no | Joe | Marketing | 50000 |
| Row 214 | no | Mary | Finance | 65000 |

FIG. 2

Change Data
Table
300

|  |  Column 202 | Column 204 | Column 206 | Column 208 |
|---|---|---|---|---|
| Row 210 | Change | Name | Department | Salary |
| Row 212 | Update | <same> | Sales | <same> |
| Row 214 | Update | <same> | <same> | 75000 |

FIG. 3

Updated
Database
400

| | Column 202 | Column 204 | Column 206 | Column 208 |
|---|---|---|---|---|
| Row 210 | Change | Name | Department | Salary |
| Row 212 | Update | Joe | Sales | 50000 |
| Row 214 | Update | Mary | Finance | 75000 |

FIG. 4

Process
500

A DATABASE, STORED AT A COMPUTER SYSTEM, IS ACCESSED WITH A PLURALITY OF DATA WRITTEN TO FIELDS IN THE DATABASE, WHEREIN EACH DATA IN THE FIELDS COMPRISES A RECORD HEADER.
502

DATA IS CHANGED IN AT LEAST ONE FIELD OF THE PLURALITY OF DATA IN THE DATABASE VIA THE COMPUTER SYSTEM, WHEREIN THE CHANGING THE DATA CHANGES THE RECORD HEADER FOR THE AT LEAST ONE FIELD.
504

A TRANSACTION IDENTIFICATION (ID) IS STORED IN THE RECORD HEADER FOR EACH CHANGE TO THE AT LEAST ONE FIELD.
506

A FLAG IS CREATED IN THE RECORD HEADER SIGNALING THE CHANGE TO THE AT LEAST ONE FIELD.
508

SUCCESSIVE VERSIONS OF THE DATABASE ARE LINKED TOGETHER SUCH THAT A SUBSCRIBER ACCESSING THE DATABASE CAN AUTOMATICALLY VIEW A CURRENT VERSION OF THE DATABASE WITH THE CHANGE BY ACCESSING THE RECORD HEADER AND IDENTIFYING THE FLAG.
510

DATABASE IS SEARCHED BASED ON A QUERY WHEREIN THE SEARCHING EMPLOYS FILTERS TO SEARCH THE RECORD HEADER TO RETURN RESULTS FOR THE QUERY BASED ON THE CHANGE.
512

FIG. 5

TRACKING CHANGE DATA IN A DATABASE

RELATED APPLICATION

This application claims priority to and is a continuation of application Ser. No. 17/339,624, entitled "TRACKING CHANGE DATA IN A DATABASE," with filing date Jun. 4, 2021, by Charles W. Caro, et al., and assigned to the assignee of the present invention, the disclosure of which is hereby incorporated herein by reference in its entirety.

The application having application Ser. No. 17/339,624 claims priority to and is a continuation of application Ser. No. 16/547,441, entitled "TRACKING CHANGE DATA IN A DATABASE," with filing date Aug. 21, 2019, by Charles W. Caro, et al., and assigned to the assignee of the present invention, the disclosure of which is hereby incorporated herein by reference in its entirety.

The application having application Ser. No. 16/547,441 claims priority to and is a continuation of application Ser. No. 14/823,884, entitled "TRACKING CHANGE DATA IN A DATABASE," with filing date Aug. 11, 2015, by Charles W. Caro, et al., and assigned to the assignee of the present invention, the disclosure of which is hereby incorporated herein by reference in its entirety.

The application with application Ser. No. 14/823,884 claims priority to and benefit of provisional U.S. Patent Application No. 62/039,824 filed on Aug. 20, 2014 entitled "CAPTURING CHANGE DATA" by Charles W. Caro, Sriram Balasubramanian, and Stephen Peter Ball, and assigned to the assignee of the present application.

FIELD OF THE TECHNOLOGY

The present technology relates generally to tracking change data in a database.

BACKGROUND

Modern technology relies upon databases to store data for a wide variety of purposes. Databases may be updated or modified to change the data that is stored. More than one user may be able to access and change the database which may lead to issues when more than one user attempts to access the database at the same time. Updating and synchronizing changes to a database may be time consuming to implement and may slow down the performance of a database. Moreover, updates or modifications to a database using traditional techniques may increase the storage requirements of the database.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "accessing," "changing," "creating," "displaying," "searching," "tracking," "subscribing," "storing," "linking," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Tracking Change Data

Databases are employed to store large amounts of data. Databases may be used by developers, enterprise customers, embedded system users, etc. Various techniques may be employed to store the data and to update, change, or modify the data. Prior solutions used different techniques to change data stored in the database. One solution was to only allow one user access to the database at a time. Other solutions allowed a plurality of users to access the database but would require replicating the database for each user and then synchronizing the replicated databases to ensure that all changes were stored in one location. Such synchronizing may require that each and every field in the database be synchronized which is difficult to implement, takes time to load changes, and affects the performance of the database. The replicated databases also have increased storage requirements on the hardware to store the replicated databases. These problems are compounded when more than two users access the database. Other techniques employed trigger logging and transaction write-ahead log scraping. Other techniques keep prior versions of a database in a linked list which also requires increased storage capacity and affects performance.

The present technology operates on a datasource or database consisting of a set of data collections. Each collection in a datasource comprises of a set of records. Each record in a collection comprises of a set of fields. To store records in the collection, a transaction is started and identified by a unique monotonically increasing transaction number. In one embodiment, whenever a record is stored, modified or deleted in its collection, it is done so in the context of its transaction and that record is stamped with the transaction number of its overarching transaction.

In one embodiment, a record is not visible to other concurrent running transactions until the parent that updated it is successfully terminated, or committed. If a transaction is unsuccessfully terminated, either voluntarily or accidently then it is considered rolled back and none of its changes are visible to other running transactions. Those changes are undone leaving the record in its original state before the update was attempted.

In one embodiment, every distinct record maintains a set of versions that act as change history of that record instance. The head, or record header, of this version changed is considered the most recent version of the record and traversing the version chain yields successively older record versions. When a different transaction queries collections of the datasource, it compares its transaction number T' to a record version V stamped transaction number T(R). Where the transaction is T and the record is R, if T>T(R) and T(R) was committed when T started then that record version is visible to T and returned. If T(R) was active when T began then it is not visible and the next version, if any, is considered in turn. Concurrency control for a datasource, may be described as a multiversioning or multigenerational database system.

The present technology is a manner of tracking record changes with field level granularity to such a datasource. Embodiments add minimal overhead to track such changes on the running transactions that update the data collections. Tracking changes efficiently has well known applications for data replication, synchronization, event detection, etc. Most such systems result in significant overhead to achieve those goals by redundantly storing copies of the data (RD) in a different section of the datasource or transfer cost to send changes remotely to another datasource or auxiliary storage container. This can severely affect production performance of a database system or defeat throughput threshold requirements.

For example, one prior solution is Trigger Logging which uses the redundant data storage approach described above, there is no easy way to request only what has changed between successive query executions across transactional boundaries at the system level. While event triggers can be defined at the data collection level for every application-specific interest in a particular type of change, this imposes execution overhead for production systems that inhibit the performance of datasource changes. This methodology is also somewhat rigid in that it usually requires an administrator to make metadata changes to running systems.

Another prior solution is Record or Field TimeStamp which is used to resolve change identification is to associate timestamp fields with every field of data and define database triggers or application logic to update the associated timestamp when its field counterpart is changed. This doubles the number of fields in the datasource and can add significant storage requirements of the datasource. There is also the application coding logic to modify query criteria to test those timestamps for changed data. This approach also has large potential for error when multiple sources are updating the same database at the same time, e.g. leading to a fetch of data based on the time stamp for identifying changes returning incomplete/inaccurate data.

Another prior solution is Briefcasing which is a technique used to download the interested query data and re-query the same data at a later time and compare the two result sets for differences. This requires all the data to be resent, which is not efficient when there are very, large result sets or transfer bandwidth is slow and/or expensive. Changes to net neutrality policies to make bandwidth chargeable, increased data traffic of premise-to-cloud infrastructure, and change detection response times are all areas that can be served better by a direct changed detection service that imposes minimal overhead on the datasource.

Embodiments of the present technology employ multi-generational architecture and control to capture change data in a database with a low impact mechanism. In one embodiment, the present technology is capable of tracking or capturing change data in a database while placing zero performance overhead on existing transactions to the database and maintains a consistent view of the changed data that is observable by other transactions. Thus the present technology improves the functioning of a computer system or other device by capturing and storing changes to a database without increasing the performance overhead of the database and its related hardware. The transactions regarding the database may be changes to fields in the database where the changes are updates, modifications, additions, deletions, etc. The change to the data in the present technology also changes a record header identifying a change in the value of each field for that record in the database.

In one embodiment, the databases associated with the present technology employ fields to the store the data where the fields are organized in rows and columns. The present technology employs a record header to store a bit array representing or storing the changes made to the data with a transaction identification (ID). The record header may also comprise a flag that signals a change to the data field. All of the record headers associated with their respective data in a database may be linked together such that a subscriber to the database may use the record headers with the transaction ID to view the most current version of the database. The view or change data view will employ the flags in the record headers to discover changes made to the database since the last time the particular user accessed the database. The transaction ID may be time-stamped. In one embodiment, the use of the time stamp against a subscriber's subscription record is to identify when a subscription was last used. This is of benefit to allow the central database to know who needs to collect changes still. In one embodiment, the proxy for date time actually falls short of what its providing as the transaction ID usage resolves issues for date time, as described above.

A session, as described herein, is a time period during which a user log in or accesses the database and to perform transactions. During a transaction or a session the present technology tracks or captures the changes made to the database and stores this as change data. The change data view is a view that is based on data already stored, or the implicit view, in the existing database and does not require a new database or replicated database of the existing database. In one embodiment, the change data view mechanism is temporal based and returns data that has changed since a prior transaction or session in which the implicit view was observed. Such a technique answers the question, "What data has changed since the last time I viewed it?" In one embodiment, a user viewing the database with the change data or change data view only sees the database as it has been changed since the last transaction. In other words, the user may be viewing both the existing database and the change data but the user only sees an updated database.

In one embodiment, a plurality of users can access the same database simultaneously without the need to replicate the database. Each change that one of the users makes to the database is tracked and captured as change data. Subsequently when a different user accesses the database, only the updated change data needs to be shown to the different user with the existing database to show the changes that been made. In one embodiment, a user may desire to only access the change data to view only data that has been changed rather than viewing the entire updated database. This may also be accomplished by searching only for columns that have changes to the data. In one embodiment, the change data that is saved only has real data to fields that have been changed and null data or no data to fields that have not been changed. Furthermore, the change data may only store data for columns that have had changes made during a transaction. By not storing data for columns that do not have changes made during a transaction reduces that amount of data that must be saved in a change data table or change data view. Such a reduction increases the performance of a database.

Tracking Change Data

Referring to the figures, exemplary embodiments of the technology will now be described. The following description will focus on an embodiment of the present technology, which is implemented using a device with an operating environment or platform such as an operating system. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

Figure 1:
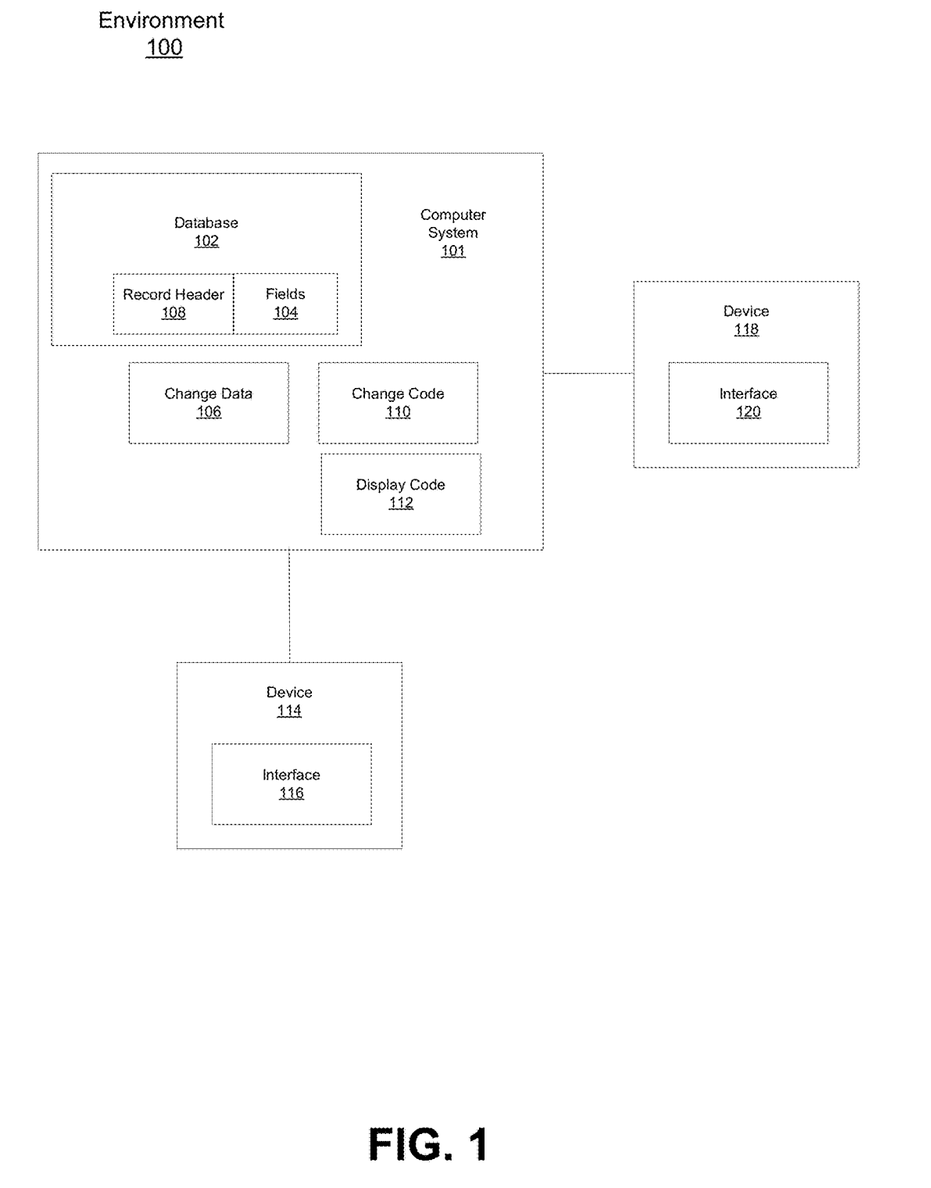
FIG. 1 is a block diagram of an environment for tracking change data in accordance with embodiments of the present technology.

FIG. 1 is a block diagram illustrating environment 100 which is an example environment comprising computer system 101. It should be appreciated that computer system 101 may be a standard or customized computer system and may be a server, desktop, laptop, tablet, handheld or other computer system. Computer system 101 may also be a plurality of computers located physically close or remote to one another and may be employed together using cloud computing techniques or server farm techniques. In one embodiment, computer system 101 comprises database 102. It should be appreciated that database 102 may refer any type of database including a relational database. In one embodiment, database 102 is an InterBase database by Embarcadero which employs multigenerational architecture. In one embodiment, database 102 stores data in fields such as fields 104 where the fields are stored in rows and columns. A row may refer to an entry where the fields in one row are related to one another. For example, the row may be an entry for a person or entity and each field in the row may be data related to the person or entity.

A user may log in or access a database using various techniques. For example, the user may be physically present at computer system 101 and log in using a username and password. A user may also employ a device different from computer system 101 to access database 102. For example, a user may employ device 114 or device 118. It should be appreciated that device 114 and device 118 may be a desktop, laptop, tablet, handheld or other computer system such as a smart phone. Device 114 and device 118 comprise interface 116 and interface 120 respectively. Interface 116 and interface 120 are interfaces such as graphical or text-based interfaces used to display and interact with database 102 and the data therein. Additionally, computer system 101 may also comprise an interface for a user to interact with database 102.

The time period during which a user logs in or accesses database 102 may be referred to as session. During a session, each interaction made with the data in fields 104 of database 102 may be referred to as a transaction. The transaction may be a change, modification, addition, update, deletion to the data. The change may affect an entire row or column or may only affect a single field. The changes or transactions are represented by change code 110 which may be generated at device 114 or device 118 and sent to computer system 101. During the session the user or actions of the user are tracked, more specifically the transactions are tracked. The tracking captures or creates change data related to database 102. The change data represents the changes made to database 102 and may be stored in or represented in a recorder header such as record header 108. It should be appreciated that record header 108 is associated with the data in a field or fields 104. Each data field will be represented in the record header. In one embodiment, the record header comprises a bit array, a transaction ID, and a flag for signaling when a change has been made to a particular field. It should be appreciated that a record header is prefixed with a unique transaction number as a proxy for last modification timestamp of record data. The record header may also be prefixed with an array of changed field flags CFF to identify which fields of record data have been modified. The record header may also have a change flag to indicate store, modify, or erase of record. In one embodiment, the record headers are used to link successive record versions together in a manner that allows traversal from current version of record to older versions of record.

The present technology employs record headers to exploit record versioning of a database to collocate change history with each record version so that there is no need for redundant data storage and the concomitant execution overhead implicit in such storage or transfer. The change history captures whether the record version is newly stored, modified or has been deleted as well as which fields of the record that have been changed. In one embodiment, when viewing a current version of the database, only the newest field values are returned and not the fields values that existed when an older record version was updated. In one embodiment, it is possible to detect a value has been changed even if it is changed back to its original value.

The term Changed Data View may be used to describe the maintenance and query of this tracked, changed record data. In one embodiment, a normal query of a datasource returns requested fields from existing records that match a given query criteria provided by the query. Records that match the query criteria are returned as a result set. Each successive execution of a query in a new transaction returns the same records from a previous execution of the query, less those records erased plus those records stored in the interim between two transactions. In one embodiment, when no data has changed, the identical result set is always returned.

In contrast, if no data has changed querying a changed data view will return no result set and when records have changed, only those records are returned and then only if interest has been expressed in the fields that have changed. This captures changes at field-level granularity rather than at record-level.

Database 102 may be accessed by a plurality of users simultaneously. For example, a first user may access database 102 via computer system 101 while a second user accesses database 102 via device 114 and a third user via device 118. Each user may be participating in a different session while the present technology is capturing change data for each session. A given user's ability to access database 102 may be referred to as a subscription where the subscription includes the ability to receive updates to database 102 based on captured change data. The subscription may be based on a username and password. The subscription may be assigned a unique subscription identification number or a string and may be created ad hoc. In one embodiment, a subscription is defined in the database to track changes to a set of changed data views. Such a subscription is then granted access to selected database users as defined by the application requirement or database administrator. A subscriber then can access one or more such subscriptions when they log in to the database.

In one embodiment, a user will express interest in a changed data view by subscribing to it. Such a subscription will denote the types of changes (Store, Modify, Erase—commonly referred to in SQL as Insert, Update, Delete) and the set of fields, F, that are of interest. In addition, the subscription maintains control information to regulate the execution of changed data view queries. In one embodiment, a Check Out Transaction, COT, is the transaction number of the last time changed data for the subscription was retrieved. There is also a set of transaction numbers, COT{T} that list the transaction numbers that were active when the subscription retrieved the changed data view (CDV). The COT{T} set is used to capture changes by transactions that were active when CIT was used to retrieve changes. Similarly, there is Check In Transaction, CIT, that is the transaction number of the last time this subscriber uploaded data to the datasource. There is also a set of transaction numbers, CIT{T}, that list all prior CIT transactions that uploaded data. The CIT{T} set is used to ignore changes during CDV retrieval that were originated by this subscriber. Otherwise, there would be a never ending reflection of changed data between the datasource and subscriber In one embodiment, to return a changed data view result set, the user activates the subscription during a connected session to the datasource. The query is submitted to the datasource with no additional syntax required to retrieve the changed data view result set.

In one embodiment, a record version's array of changed field flags is saved to be returned. Each successive records version in the chain is visited and its array of changed field flags is OR'ed to the saved array of changed field flags. This continues until a record version transaction T(RV) is found that is older than the current Check Out Transaction COT for the subscription, i.e. COT>T(RV) and T(RV) not an element of COT{T}. Iterating over all such record versions gives a final array of changed field flags that denote all fields that have changed since the changed data view subscription was queried by transaction COT. In one embodiment, when transaction T commits, it updates the COT in the changed data view subscription with its transaction number TN, COT=T(TN), and records all active transactions when T started, COT{T}=set of all active T(TN)s.

In another embodiment, when a transaction T changes data while the associated changed data view subscription is activated on a session, when T commits it stores its TN into the set of prior Check In Transactions CIT{T}. When the next Check Out occurs, any records versions stamped with those transaction numbers are skipped during processing. If the primary (newest) record version would be excluded by this test, it is still necessary to traverse the record version chain to check their arrays of changed field flags for a RV(T) not an element of COT{T}.

In one embodiment, it is possible to truncate record data from a record leaving only the record header with a transaction number and an array of change field flags resulting in a much smaller change stub. Additionally, auxiliary structures supporting record versions, e.g. indexes and Blob data, would be garbage collected to save more space. In one embodiment, it is possible to consolidate successive change stubs if they have the same or inclusive subset of changed field flags and the range of record version transaction numbers RV(T) spanned by those record versions that lie between the CITs of successive subscriptions.

In one embodiment, a user may have more than one subscription associated with database 102. The notion of multiple subscriptions against the same schema object for a user is motivated by two observations. First, each subscription for a user might connote a separate device among many that have a disconnected interest in a change set that is queried independently at different times for different purposes. Second, some multi-user applications use pooled database connections under the umbrella of a user name. In these cases, an alternate identifier must be provided to distinguish which subscription should be used to query a change set.

In one embodiment, activating a subscription for database 102 returns the changed data set from a subscribed table. In one embodiment, a command COMMIT may be executed that updates all subscriptions for schema objects referenced during the transaction to set that last observed timestamp. In one embodiment, a COMMIT RETAINING command does not change the last observed state and maintains the current snapshot as always. The subscription is deactivated for the connection, which makes any subsequent queries against subscribed schema objects return normal data sets, without regard to changed data status. Any number of subscriptions can be activated simultaneously during a database connection.

In one embodiment, changed data views can be subscribed to on a temporary basis using anonymous subscriptions. The user subscribes directly to a schema object instead of a named subscription. The subscription is valid until the database connection is terminated or the user deactivates the temporary subscription during the connection.

In one embodiment, displaying only the original data from database 102 may be referred to as a normal VIEW or base table. Whereas a changed data view may show both the change data with the original data or base table. In one embodiment, the changed data view can be referenced in an ad hoc manner or can be subscribed to in order to view data that has changed across database connections. The effect is a long-lived transaction that spans multiple database connections. In particular, the subscription can be used to track all row inserts, updates and deletes to one or more tables at a column-level granularity over a disconnected, extended period of time. In one embodiment, the database is accessed and changed using structured query language (SQL). In one embodiment, InterBase SQL query language is modified to search on columns for which data has changed since the prior observation. The implication is that data changes are tracked at a column granularity.

Figure 2:
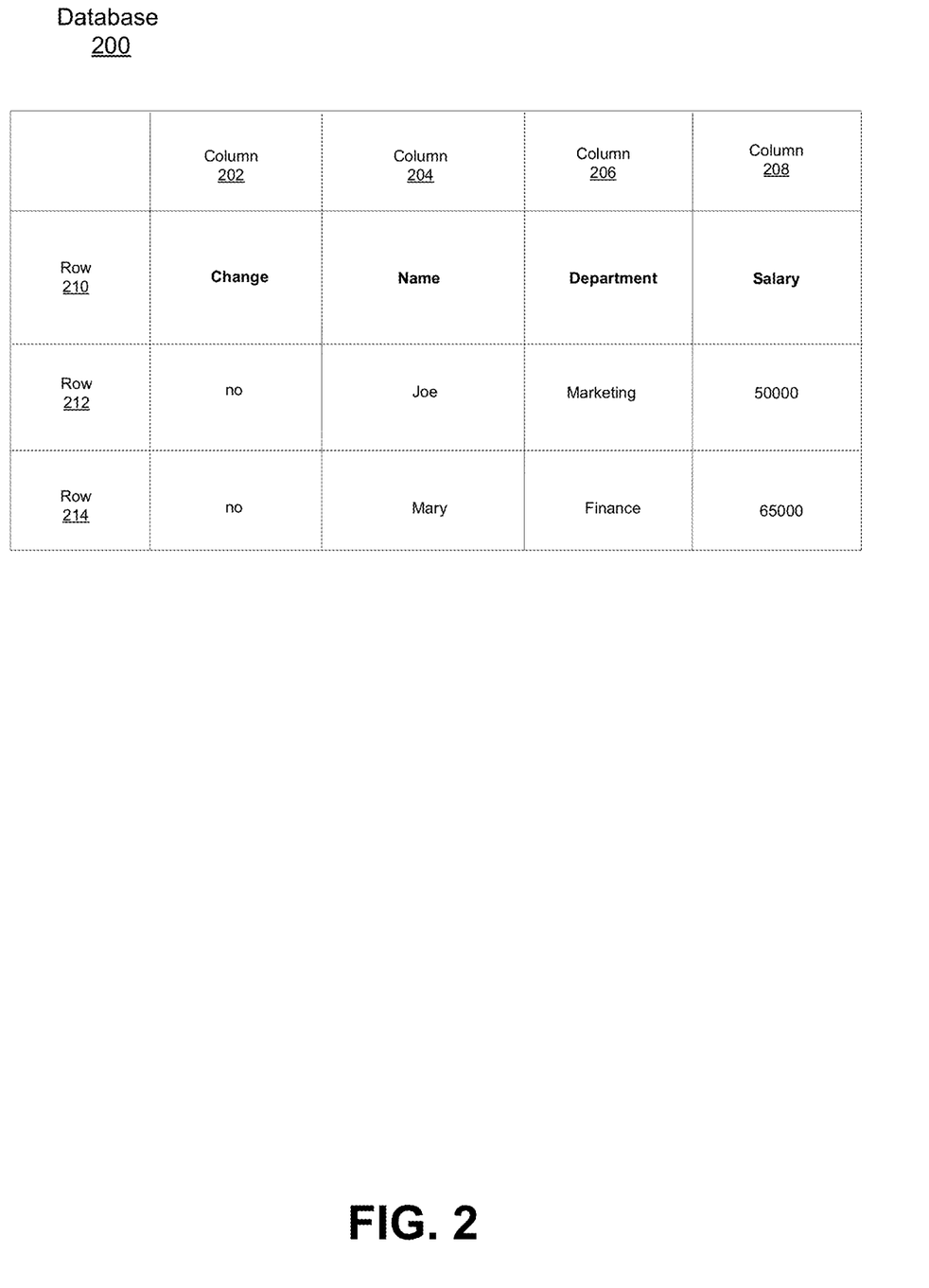
FIG. 2 is a block diagram of a database in accordance with embodiments of the present technology.

FIG. 2 is a block diagram illustrating database 200 which is an example database that may be referred to as original or existing database or a base table. Database 200 may also be described as a database before data has been changed during a session or transaction. Database 200 is a specific example of database that comprises employee information for two employees of a corporation named Joe and Mary. Columns 202, 204, 206 and 208 comprise columns of data, in this example they represent change, name, department, and salary respectively. Row 210 comprises the title for each column of data, specifically change, name, department, and salary. Row 212 comprises data for Joe while row 214 comprises data for Mary. The present technology is not limited to any number of columns or rows nor to any type of data stored in a database.

In one embodiment, column 202 comprises change data meaning whether or not a given row comprises change data. In this example, database 200 is the original database and does not comprise any change data. Therefore the entry in the fields for both row 212 and 214 state "no." In one embodiment, the change data in column 202 can be described as a virtual calculated field.

Figure 3:
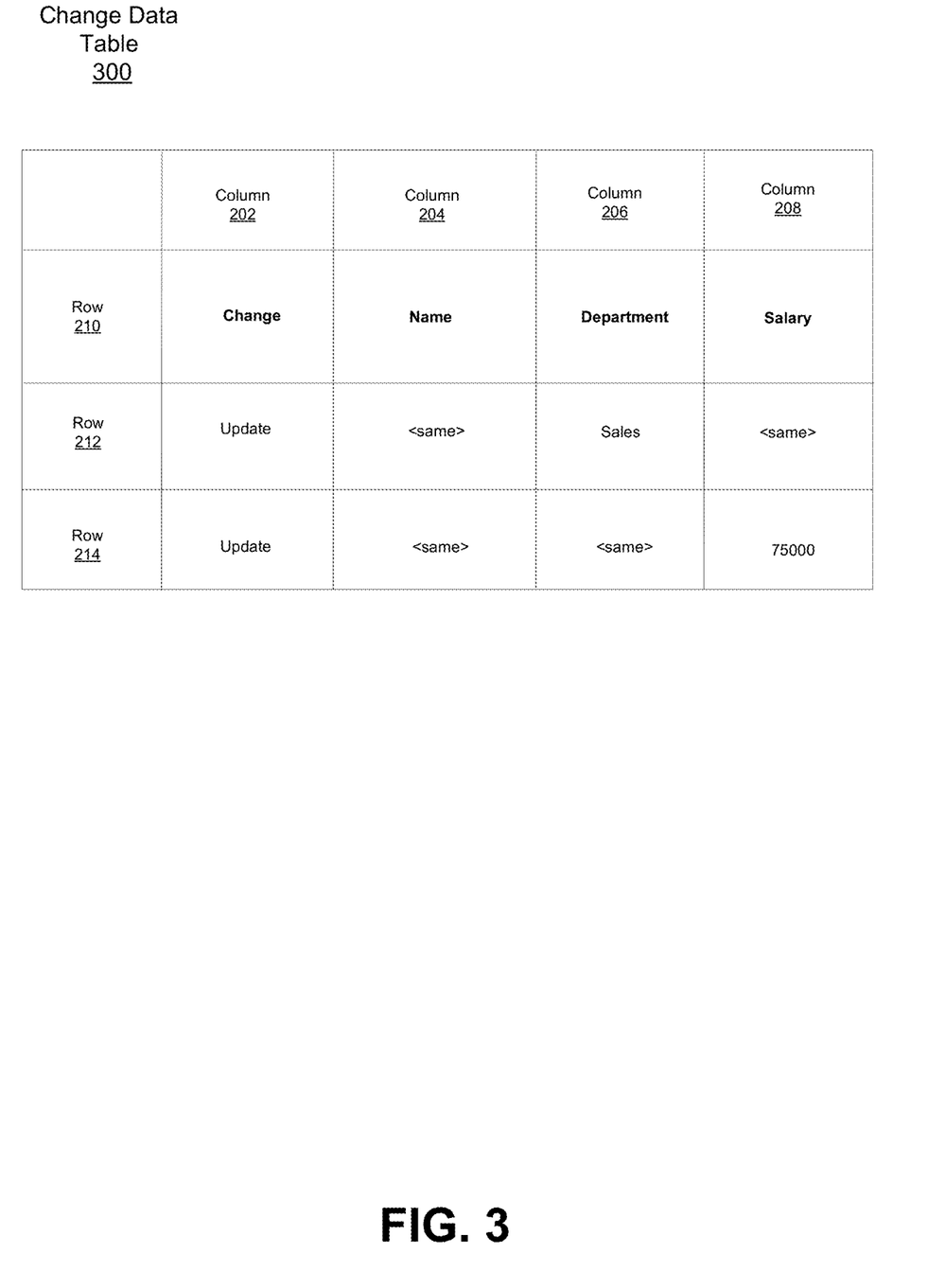
FIG. 3 is a block diagram of a change data view for a database in accordance with embodiments of the present technology.

FIG. 3 is a block diagram illustrating data table 300 which is an example of a data table that comprises change data for database 200. For example, the change data may be the record headers which are disclosed in < >brackets. In data table 300 specifically, four fields of data have been changed with respect to database 200. The field associated with column 206 and row 212 has been changed from marketing to sales indicating that the employee Joe has been changed from the Marketing department to the Sales department with the corporation. The field associated with column 208 and row 214 has been changed from 65000 to 75000 which indicates that Mary's salary has been increased by 10000. In column 202, both fields associated with row 212 and row 214 have been changed to "update" indicating that a field of data has been updated or needs to be updated in the respective row. This may be described as a flag. Essentially, column 202 reflects a yes or no indication as to whether data in a given row has been changed. The fields associated with row 210 remain the same as they indicate the title of the given column. All other fields in rows 212 and 214 are marked <same>. This indicates that no change has been made to the data those fields with respect to database 200. In other words, a column of data table 300 may store real data such as "sales" in column 206 and row 212 or null data meaning no data represented by <same>. Data table 300 may be viewed by itself to quickly indicate to a user which fields have been changed in the last session(s). The last session(s) may have been performed by the same user viewing data table 300 or by a different user. In one embodiment, data table 300 only displays columns and/or rows that have changes made. For example, column 202 may be searched to find all rows that have been labeled "update" and only those rows are displayed. Also, columns may be searched and a column that only displays <same>will not be displayed. For example, if a user desired to only view changed columns, then column 204 would not be displayed. In one embodiment, a search may be performed on data in column 204 using SQL extensions.

Figure 4:
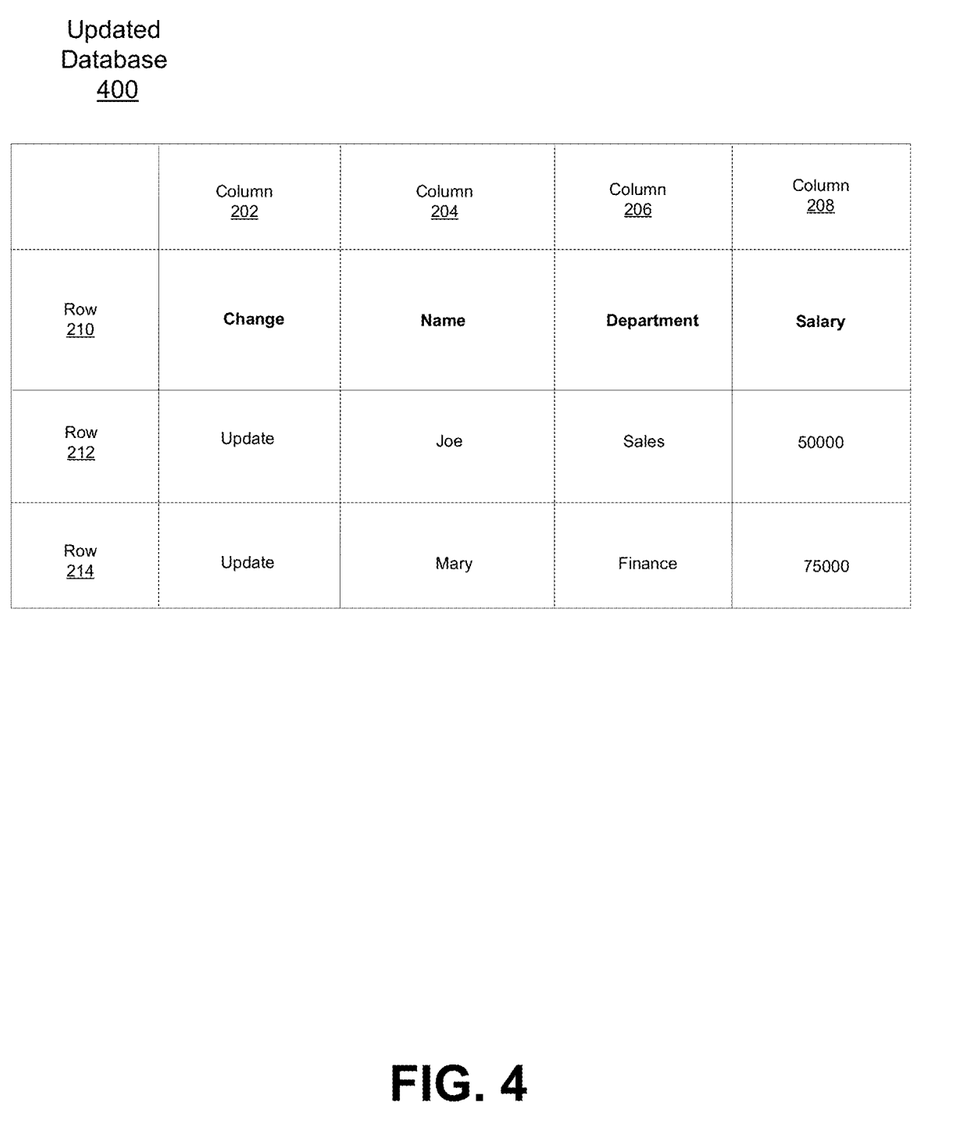
FIG. 4 is a block diagram of an updated database in accordance with embodiments of the present technology.

FIG. 4 is a block diagram illustrating updated database 400 which is an example of an updated database or a change data view of database 200. In one embodiment, updated database 400 is a display of a database that is based on both database 200 and data table 300. The result is a display of an updated database that reflects original unchanged data and data that has been changed. In updated database 400 specifically, the field associated with column 206 and row 212 has been changed from marketing to sales and the field associated with column 208 and row 214 has been changed from 65000 to 75000. Column 202 may or may not be displayed in updated database 400 indicating whether or not updates have been made to the associated row.

Operations

Figure 5:
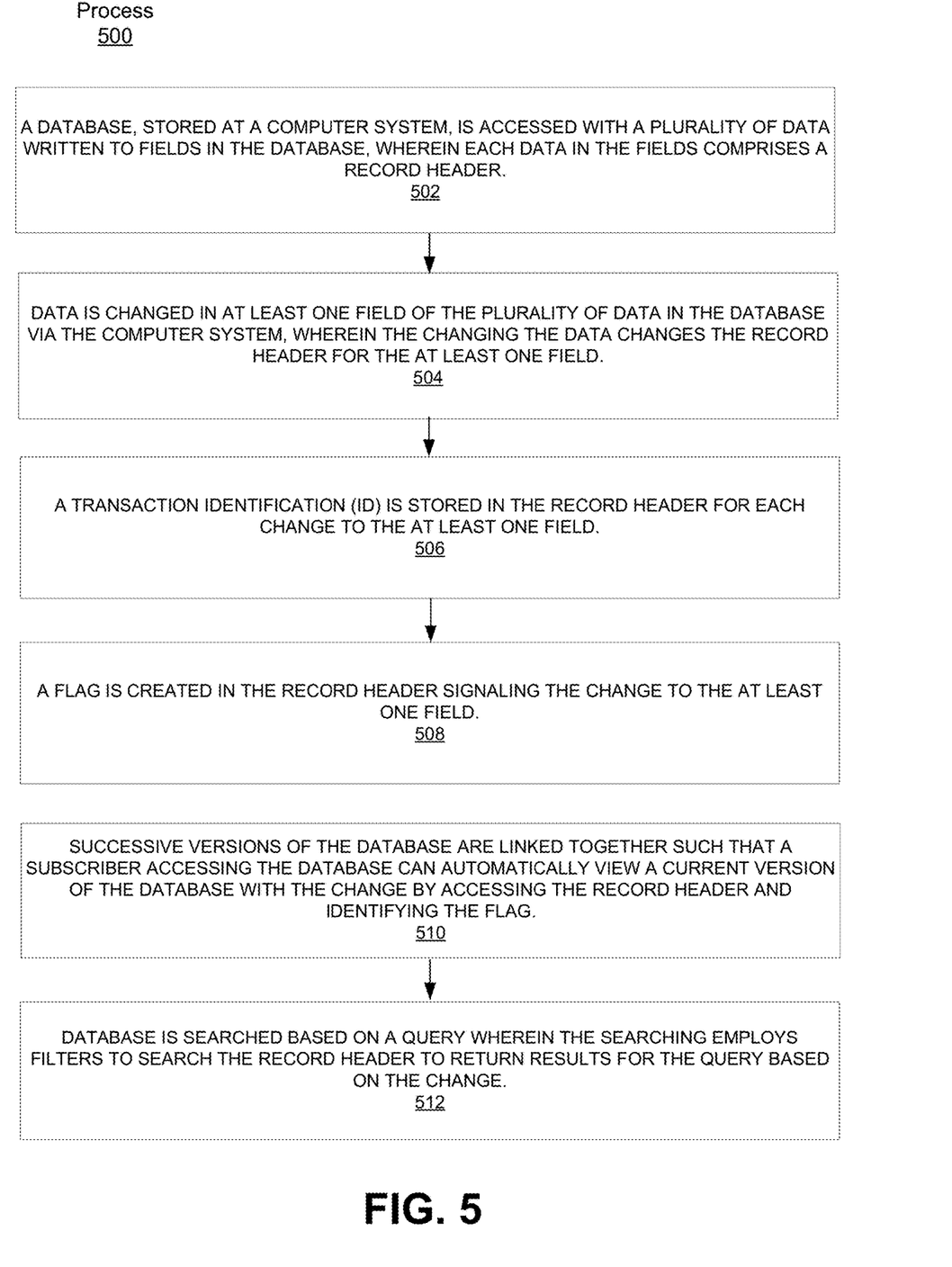
FIG. 5 is a flowchart for tracking change data in accordance with embodiments of the present technology.

FIG. 5 is a flowchart illustrating process 500 for tracking change data, in accordance with one embodiment of the present invention. In one embodiment, process 500 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 500 is performed by devices and databases in FIGS. 1-4.

At 502, a database, stored at a computer system, is accessed with a plurality of data written to fields in the database, wherein each data in the fields comprises a record header. For example, the database may be database 102 of FIG. 1 stored on a computer system such as computer system 101. The database may be referred to as an original or existing database and may be used as a base layer for other subsequent views or versions of the database.

At 504, data is changed in at least one field of the plurality of data in the database via the computer system, wherein the changing the data changes the record header for the at least one field. The user may employ computer system 101 of FIG. 1 or a different device such as device 114 or device 118. The changes are tracked or captured as they are made. The changes may be made by a user who has subscribed to the database with a user name and password. Alternatively the database may authorize users to anonymously make changes to the database. The database may be maintained by and changed using structured query language (SQL).

At 506, a transaction identification (ID) is stored in the record header for each change to the at least one field. The record header may comprise a bit array with 2 bits where the first bit indicates whether the data for the at least one field has been deleted and the second bit indicates whether the data has been inserted or updated. In one embodiment, the transaction ID in the record header comprises a timestamp. It should be appreciated that the timestamp may only be employed to clean up expired subscriptions and, in one embodiment; the record header does not comprise a timestamp.

At 508, a flag is created in the record header signaling the change to the at least one field.

At 510, successive versions of the database are linked together such that a subscriber accessing the database can automatically view a current version of the database with the change by accessing the record header and identifying the flag.

At 512, database is searched based on a query wherein the searching employs filters to search the record header to return results for the query based on the change.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 101 and/or device 114 and device 118 of FIG. 1. Described below is an example computer system or components that may be used for or in conjunction with aspects of the present technology such as the ability to run or create a three dimensional interface.

It is appreciated that that the present technology can operate on or within a number of different computer systems including general purpose networked computer systems, embedded computer systems, a personal computer such as a desktop computer, a laptop, a notebook, an electronic handheld device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for querying a database, the method comprising:
receiving a query for searching a database comprising a plurality of data, the query comprising query criteria for returning at least one requested field of the plurality of data from the database;
searching the database based on the query for the at least one requested field of the plurality of data, the database comprising a base table comprising an original state of the plurality of data and a change data table comprising changes made to the base table, and wherein successive versions of the database are linked together such that a current version of the database with the changes is automatically viewable responsive to accessing a record header of the data and identifying a flag within the record header of the data signaling a change to at least one field within the change data table; and
returning results of the query, such that the results returned provide the current version of the database with the changes.

2. The method as recited in claim 1, wherein the record header comprises a bit array used to indicate how the field has been changed.

3. The method as recited in claim 2, wherein the bit array comprises at least two bits, wherein a first bit indicates whether the data for the at least one field has been deleted and a second bit indicates whether the data has been inserted or updated.

4. The method as recited in claim 1, wherein the record header comprises a transaction identification (ID) for each change to the at least one field within the change data table.

5. The method as recited in claim 4, where the transaction ID in the record header comprises a timestamp.

6. The method as recited in claim 4, wherein subscriptions are employed with the transaction ID to track change data unique to each one of a plurality of users that are able to access the database simultaneously and change the plurality of data.

7. The method as recited in claim 1, wherein a plurality of users are able to access the database simultaneously and change the plurality of data and wherein a plurality of record headers are able to store change data from each of the plurality of users without requiring a replication of the database and/or rows of the database based on the change.

8. The method as recited in claim 1, wherein the database employs structured query language (SQL).

9. A non-transitory computer readable storage medium having instructions embodied therein that when executed cause a computer system to perform a method for querying a database, the method comprising:
receiving a query for searching a database comprising a plurality of data, the query comprising query criteria for returning at least one requested field of the plurality of data from the database;
searching the database based on the query for the at least one requested field of the plurality of data, the database comprising a base table comprising an original state of the plurality of data and a change data table comprising changes made to the base table, and wherein successive versions of the database are linked together such that a current version of the database with the changes is automatically viewable responsive to accessing a record header of the data and identifying a flag within the record header of the data signaling a change to at least one field within the change data table; and
returning results of the query, such that the results returned provide the current version of the database with the changes.

10. The non-transitory computer readable storage medium as recited in claim 9, wherein the record header comprises a bit array used to indicate how the field has been changed.

11. The non-transitory computer readable storage medium as recited in claim 10, wherein the bit array comprises at least two bits, wherein a first bit indicates whether the data for the at least one field has been deleted and a second bit indicates whether the data has been inserted or updated.

12. The non-transitory computer readable storage medium as recited in claim 9, wherein the record header comprises a transaction identification (ID) for each change to the at least one field within the change data table.

13. The non-transitory computer readable storage medium as recited in claim 12, where the transaction ID in the record header comprises a timestamp.

14. The non-transitory computer readable storage medium as recited in claim 12, wherein subscriptions are employed with the transaction ID to track change data unique to each one of a plurality of users that are able to access the database simultaneously and change the plurality of data.

15. The non-transitory computer readable storage medium as recited in claim 9, wherein a plurality of users are able to access the database simultaneously and change the plurality of data and wherein a plurality of record headers are able to store change data from each of the plurality of users without requiring a replication of the database and/or rows of the database based on the change.

16. The non-transitory computer readable storage medium as recited in claim 9, wherein the database employs structured query language (SQL).

17. A computer system comprising:
a non-transitory data storage unit; and
a processor coupled with the non-transitory data storage unit, the processor configured to:
receive a query for searching a database comprising a plurality of data, the query comprising query criteria for returning at least one requested field of the plurality of data from the database;
search the database based on the query for the at least one requested field of the plurality of data, the database comprising a base table comprising an original state of the plurality of data and a change data table comprising changes made to the base table, and wherein successive versions of the database are linked together such that a current version of the database with the changes is automatically viewable responsive to accessing a record header of the data and identifying a flag within the record header of the data signaling a change to at least one field within the change data table; and
return results of the query, such that the results returned provide the current version of the database with the changes.

18. The computer system as recited in claim 17, wherein the record header comprises a bit array used to indicate how the field has been changed.

19. The computer system as recited in claim 18, wherein the bit array comprises at least two bits, wherein a first bit indicates whether the data for the at least one field has been deleted and a second bit indicates whether the data has been inserted or updated.

20. The computer system as recited in claim 17, wherein the record header comprises a transaction identification (ID) for each change to the at least one field within the change data table.

* * * * *